United States Patent

Szabo

[11] Patent Number: 5,283,954
[45] Date of Patent: Feb. 8, 1994

[54] KNIFE

[76] Inventor: Stephan Szabo, Tumigerstr. 62A, 8606 Greifensee, Switzerland

[21] Appl. No.: 977,713

[22] Filed: Nov. 17, 1992

[30] Foreign Application Priority Data

Nov. 21, 1991 [CH] Switzerland .......................... 3417/91

[51] Int. Cl.$^5$ .............................................. B26B 1/00
[52] U.S. Cl. ................................................ 30/125
[58] Field of Search ............... 30/2, 40, 85, 86, 125, 30/144, 162, 164; 7/150

[56] References Cited

U.S. PATENT DOCUMENTS

| | | | |
|---|---|---|---|
| 2,980,996 | 4/1961 | Beran | 30/125 |
| 3,927,473 | 12/1975 | Braginetz | 30/125 |
| 4,068,375 | 1/1978 | Rathbun et al. | 30/125 |
| 4,744,146 | 5/1988 | Schmidt | 30/125 |
| 5,023,996 | 6/1991 | Pape et al. | 30/125 |
| 5,042,154 | 8/1991 | Gilbert | 30/125 |
| 5,093,994 | 3/1992 | Karas | 30/125 |

Primary Examiner—Richard K. Seidel
Assistant Examiner—Paul M. Heyrana
Attorney, Agent, or Firm—Watson, Cole, Grindle & Watson

[57] ABSTRACT

The blade includes a frame body designed as latticework which forms together with two handle shells which can be snapped onto its side the blade handle, and includes a blade which can be clamped by a clamping screw which can be screwed into the frame body into a thread thereof located at the foreward end section of the knife handle, which blade is pressed against a supporting body covered by hard metal and located in the frame body. By the pressing of the blade against the hard metal by means of a clamping screw of which the diameter is larger than the width of the blade any kind of blades can be clamped in the knife handle without using the form locked arresting between blade and knife handle for instance in form of recesses at the edge of the blade such as common at the blades of various designs being generally available on the market. The knife can, therefore, be used with all blades available on the market.

9 Claims, 2 Drawing Sheets

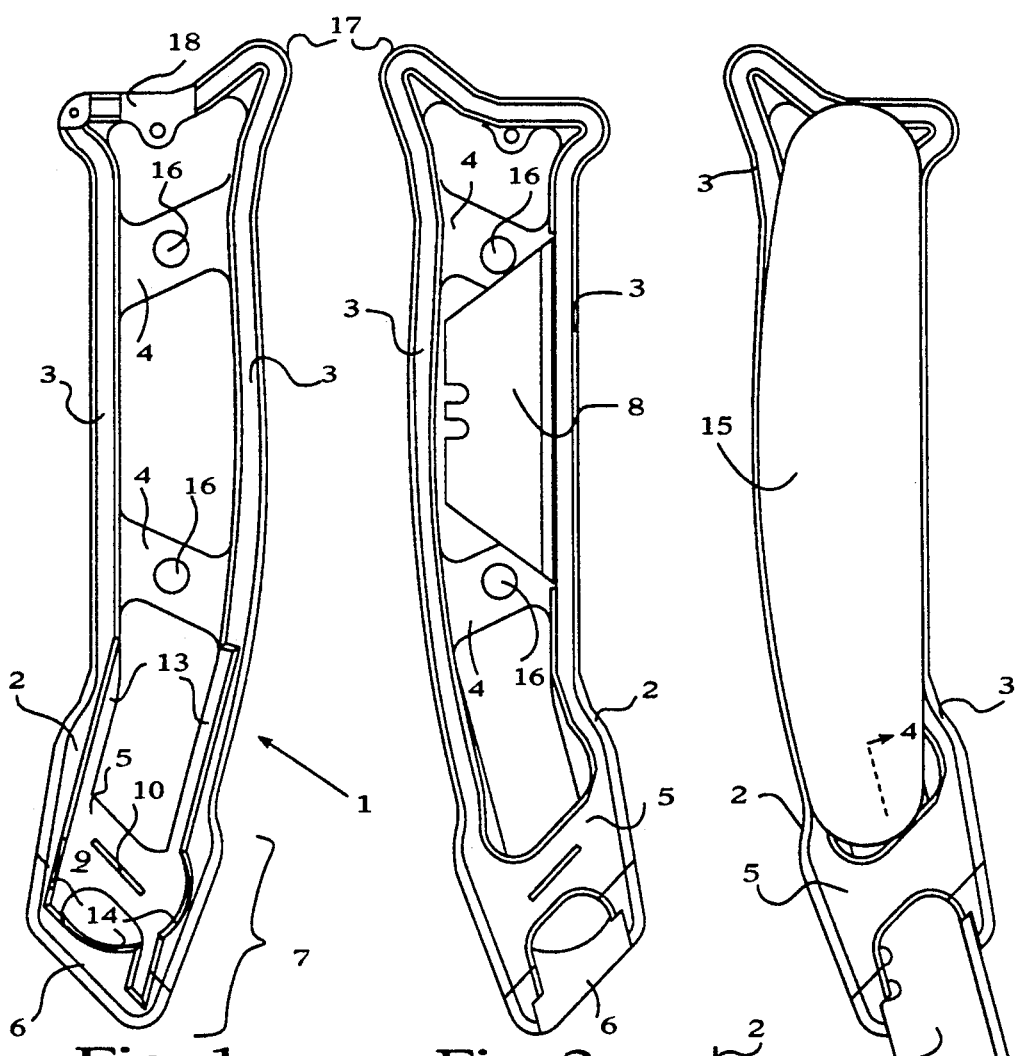
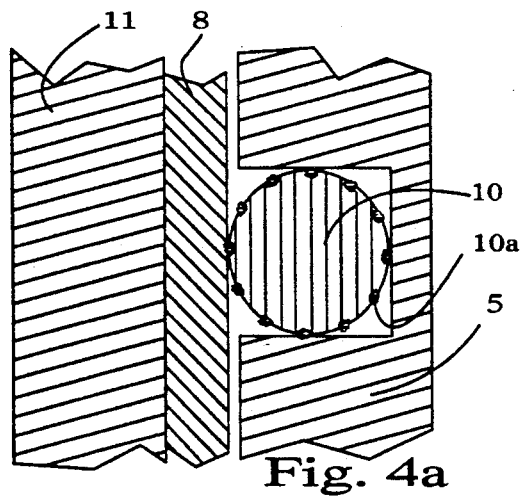
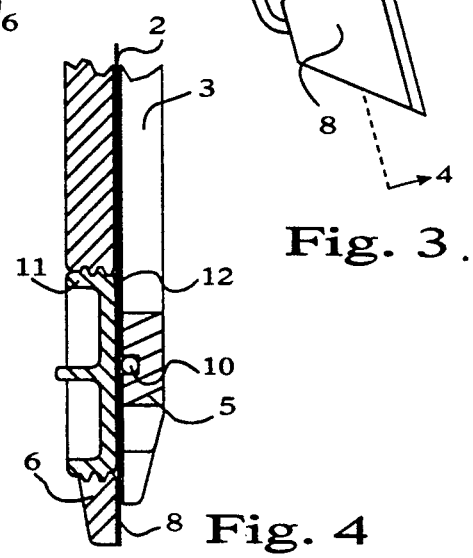
Fig. 1  Fig. 2  Fig. 3  Fig. 4a  Fig. 4

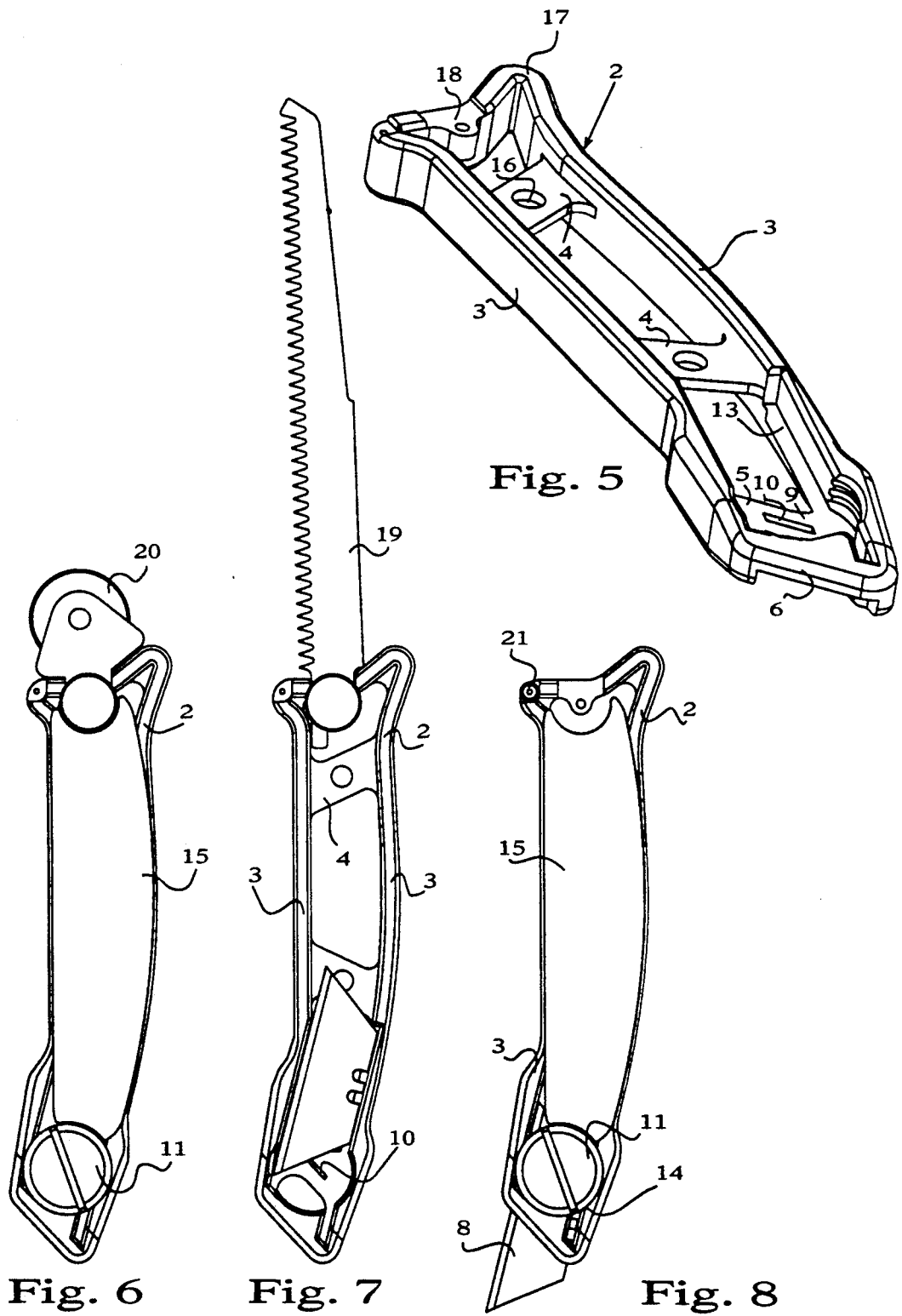

KNIFE

BACKGROUND OF THE INVENTION

1. Field of the Invention

The present invention relates to a knife having a knife handle and a blade including a first and a second, opposite planar surface, which knife handle has a front end section and a rear end, a blade guiding means located at the front end section, the blade being held in the guiding means in a manner allowing a sliding motion into and out of the knife handle and is adapted to be arrested therein in a clamped state.

2. Description of the Prior Art

Known knives of this kind are used by craftsmen for a large variety of operations for which an extremely sharp cutting edge at the blade is indispensable. However, due to wear and tear and the nature of the material to be cut such blades become blunt in a relatively short time and they must be exchanged for a new one. Knives of this kind are used, for instance, for cutting wall-to-wall carpets, and allow any arbitrary course of the cutting line along even unevenly delimited surfaces receiving such carpets with the highest precision, which can not be done technically by means of scissors. When not in use, the blade of such a knife must be set back and arrested in the knife handle in order to avoid any injury.

In order to slide the blade into and out of, the knife handle, various designs of known knives have a blade slider in the knife handle, which slider engages by a part projecting from the edge a specific recess at the edge of the blade, such that the blade which is held in a form locked manner at the blade slider is arrested by the blade slider which can be arrested at various arresting positions along the blade handle respective desired operating positions in a more or less projected state.

Various blade standards for such knives exist for instance in Europe, in America and in Japan, whereby the difference consists in the shape and also in the kind of operation of the connection to be made between the blade and the knife handle which connection can be disengaged in a simple manner. Instead of the recess in the edge of the blade as mentioned above and used in Europe, the blades used in America have a longitudinal slot at their center and the shaft of a clamping screw pressed against the blade projects through mentioned slot which shaft acts as a guide for the blade which can be slid in and out along a distance set by the longitudinal slot.

The safe arresting of the blade at its desired operating position projecting to a larger or lesser extent from the knife handle and relative thereto is solved by the known knives in various ways and in part by quite intrinsic structures. The knife handle and the blade to be used therewith correspond always to each other regarding their design, such that it is not possible to use blades corresponding to the European blade standards in a knife handle which is designed for blades designed in accordance with the American Standards.

SUMMARY OF THE INVENTION

A general object of the present invention is to provide a knife which is universally suitable for use with blades of the various blade standards, in the knife handle of which available blades, such as for instance according to the European, American or Japanese standards can be safely arrested by simple structures.

A further object is to provide a low-cost knife by means of a simple, suitable design which due to its usability for all blade standards, allows the production of knives in a much higher quantity and are correspondingly cheaper.

A still a further object is to provide a knife which can be somewhat adapted to the individual desires of its user regarding its handling and which, apart from being a handtool, can also be used together with a machine device.

Yet a further object is to provide a knife in which the front end section of the knife handle comprises a thread, a clamping screw adapted to be pressed against the first planar surface of the blade, a blade resting surface located opposite of the clamping screw, and a supporting body covered by a hard metal and arranged in the blade resting surface to project somewhat therefrom, whereby the blade is adapted to be pressed by the clamping screw at the second, opposite surface against the hard metal.

A further object is to provide a knife in which a wire equipped with hard metal chips and adapted to be the supporting body is located in the blade support surface in the knife handle end section.

The advantage of the knife is that the blade is arrested and clamped at the front most area of the knife handle and is thereby pressed against the hard metal, whereby the blade is held absolutely firm also without a form locked support. By means of such design it is possible to use the knife together with any blade of the above mentioned standards which are used in Europe, America or Japan, whereby the various specific designs of these blades are here of no importance.

A further object is to provide a knife of which the knife handle includes a frame body designed as latticework having longitudinal frame spars forming the narrow edges of the knife handle and cross struts interconnecting the spars. Handle shells filling out the contour of the frame can be mounted to both sides of this flat frame, which shells can be designed either slightly domed or quite bulgy, such that individual desires of the users regarding the manipulating of the knife can be met by variously designed knife handles. The planar, latticework like frame body without the handle shells allows, furthermore, to mount the knife by means of the cross-structs, of which every one has a through hole, to for instance a slide of an apparatus by means of which precisely rectilinearly extending cuts can be made.

Yet a further object is to provide a knife, in which the rear end of the knife handle is designed in such a manner that various other tools can be attached to the frame body, such as for instance a saw blade or circular cutters to be attached by means of a special support or glass cutters, for which the frame body includes a flange formed by a recess in the frame and having a thread.

BRIEF DESCRIPTION OF THE DRAWINGS

The invention will be better understood and objects other than those set forth above, will become apparent when consideration is given to the following detailed description thereof. Such description makes reference to the annexed drawings, wherein:

FIG. 1 is a side view of the frame body of the knife as seen from the front side having the clamping screw;

FIG. 2 is a side view of the frame body of the knife seen from the rear side;

FIG. 3 is a side view of the knife with the frame body completed by handle shells and the blade;

FIG. 4 is a partial longitudinal section through the knife along line 4—4 of FIG. 3;

FIG. 4a shows an enlarged detail of FIG. 4;

FIG. 5 is a perspective view of the frame body of the knife as seen from the front side; and FIGS. 6 to 8 side views of the knife with various tools which can be mounted to the knife handle.

DESCRIPTION OF THE PREFERRED EMBODIMENTS

The knife includes a knife handle 1 adapted to clampingly hold an exchangeable blade and this knife handle has a frame body 2 illustrated in FIG. 1 and FIG. 2 as seen from different sides, which frame body 2 is designed as lattice-work consisting of longitudinal frame spars 3 and interconnecting cross-struts 4, 5 and 6. The two cross-struts 4 located roughly at the center and the rear end area, provide for the requisite stability of the frame body 2. The frame body is preferably an integral cast structure of metal or plastic material and can accordingly be produced at low cost. In the front end section 7 of the knife handle the two longitudinal spars 3 are interconnected by two further cross-struts 5 and 6 which are staggered relative to each other in the longitudinal direction of the knife handle and are located at opposite sides of the center plane of symmetry of the knife handle, such as best seen in FIG. 4 and FIG. 5, whereby the blade 8 of which a longitudinal section is illustrated in FIG. 4 is located in this center plane of symmetry. The two cross-struts 5 and 6, which due to the production of the frame body 2 as an integral molded piece are staggered laterally relative to each other due to the moulding process, have the function of rigidly connecting the blade 8 to the knife handle formed by the frame profile 2. The cross strut 5 located inwards from the cross strut 6 forming the end of the frame defines the resting surface 9 of the blade. A support body 10 which is preferably a wire, in which hard metal chips are embedded, is set in such a manner in the cross-strut that it projects somewhat above the blade resting surface 9. The blade 8 is pressed onto this support body 10 covered by hard metal chips 10a (see FIG. 4a) by means of a clamping screw 11 located at the other side of the blade 8. The diameter of this quite flat clamping screw 11 is larger than the width of the blade 8 such that the clamping surface exerts by its planar front surface 12 a pressing-on pressure over the entire width of the blade, such that the blade 8 is firmly arrested in that it is pressed at the opposite side against the wire 10 covered by hard metal chips.

FIG. 1 and FIG. 4 disclose that the blade 8 is held between the two cross-struts 5 and 6 which accordingly also act as guide for the blade, whereas the blade 8 is guided at its opposite longitudinal narrow edges at the two longitudinal spars 3 of the frame body 2, for which reason the longitudinal spars are designed at their inner side with a recess in such a manner that resting edges 13 for the blade 8 are present. These resting edges 13 extend also from the cross-strut 5 towards the front end of the knife handle, such as illustrated in FIG. 1, for which reason the cross-strut forming at this location the forward end is recessed due to manufacturing reasons.

A thread 14 for the flat clamping screw 11 of which the diameter is larger than the diameter of the blade 8 is formed at the inside facing edge of the cross-strut 6 and at the inner edges of the two longitudinal spars 3 of the frame body 2, which edges include a circular recess. According to FIG. 1, the cross-strut 6 and the two longitudinal spars 3 include only portions of the circumference of the thread 14 which extends totally over a little more than a semi-circle, which, however, is sufficient for the tightening of the clamping screw 11. When not in use, the blade 8 can be slid into the blade handle and arrested there safely by the clamping screw.

The frame body 2 is designed in total slightly bent and is broadened at its rear end in such a manner, that it can be comfortably taken into the hand and used as knife handle. The frame body 2 can be encased at both of the two open longitudinal sides by handle shells 15, which shells can be mounted to the frame body 2 by means of a not illustrated snap connection. Accordingly, the knife can be held more comfortably by the hand such that also more force can be exerted. It is possible to select among variously shaped handle shells 15 which are interchangeable such that depending on the desires of the user, a low domed or a higher bulged handle shell can be used. The kit principle with the possibility to determine the final shape of the knife grip by selecting certain handle shells provides also for the further advantage, in that the knife when having only the flat frame body 2 and parallel outer sides can be used, too, namely by a mounting of the frame body for instance to a slide of a cutting device in order to produce by a moving along a guide of this device absolutely rectilinear cuts which if the guide can be set at an angle relative to a substrate may also be made as slanted cuts through a material to be cut. In order to mount the frame body 2 in such a device both cross-struts 4 include a through bore 16 for mounting screws.

When the two handle shells 15 are mounted to the frame body 2, a hollow space is present between the sells 5 at the areas of the cross-struts 4 in order to place a supply of blades therein, such that if need arises always a new blade is available.

Besides a cutting by means of the blade, the knife which has been developed from the point of view of a lowcost production and versatile application serves also as handle for further tools which can exchangeably be mounted to the rear end 17 of the knife handle. For this reason the frame body 2 includes at the frame portion forming the rear end 17 a flanging-on surface 18 formed by a recess and having a threaded bore, such that a correspondingly designed mounting end of a saw blade 19 or a support carrying a circular cutter 20 may be exhangeably mounted at this place. Furthermore, a glass cutter 21 is mounted at the low corner of the broadened rear end 17 of the frame body 2. Quite obviously, other, differently structured tools may be mounted to the described blade handle.

The main advantage of the knife is that by means of the principle of arresting the blade by means of a clamping screw pressing the blade against a supporting body with embedded hand metal chips, any blade available on the market can be used, independently of the standard according the which it is designed.

While there is shown and described a present preferred embodiment of the invention, it is to be distinctly understood, that the invention is not limited thereto, but may be otherwise variously embodied and practiced within the scope of the following claims.

I claim:

1. A knife having a knife handle with a front end section and a rear end, a blade guiding means located at said front end section and clamping means for arresting a blade in the front end section, said knife handle consisting of a one piece frame body in the form of a lattice work having longitudinal frame spars forming narrow sides of the knife handle and cross struts interconnecting said longitudinal frame spars, on of said cross struts forming a blade resting surface and being provided with a supporting body covered by a hard metal arranged in said blade resting surface to project therefrom, said blade being adapted to be pressed against said supporting body covered by hard metal by means of a clamping screw which is held in a thread formed in the frame body-front end section including a further cross strut.

2. A knife of claim 1, wherein the supporting body is a wire covered with hard metal chips located in one cross strut of the frame body opposite a planar front surface of the clamping screw.

3. A knife of claim 1, wherein said cross struts of the handle interconnecting said longitudinal frame spars are staggered in the longitudinal direction of the knife handle and said cross struts and longitudinal frame spars forming blade guiding means and wherein said thread for the clamping screw of which the diameter exceeds the width of the blade, is formed on the inside edge of said cross strut and on said two longitudinal spars with a partial circumferential section of the thread respectively.

4. A knife of claim 1, wherein said frame body formed of a lattice work forms an integral moulded part of a light metal or a plastic material.

5. A knife handle for use with a knife blade having opposite flat surfaces and a sharpened edge, said knife handle including:
    a one piece frame body formed of two longitudinal frame spars and a plurality of cross struts connected between said two longitudinal frame spars, said frame body having a front end section and a rear end and defining an imaginary plane that extends through said two longitudinal frame spars, first and second cross struts of said plurality of cross struts being located in said front end section of said knife handle and on opposite sides of said imaginary plane, thereby providing a channel therebetween for the passage of a knife blade, said first cross strut providing a surface facing said channel and mounting a friction body therein which extends beyond said surface towards said channel, and
    a clamping screw rotatably mounted to the front end section of said frame body for pressing a knife blade against said friction body of said first cross strut so as to lock a knife blade in a use position relative to said knife handle or to lock a knife blade in a stored position within said knife handle.

6. A knife handle according to claim 5, wherein said second cross strut includes a part circular, threaded indentation in a side thereof to which said clamping screw is engaged.

7. A knife handle according to claim 6, wherein each of said two longitudinal frame spars includes a part circular, threaded indentation therein to which said clamping screw is engaged.

8. A knife handle according to claim 5, wherein said surface of said first cross strut is flat.

9. A knife handle according to claim 5, wherein said friction body consists of a wire having hard metal chips in an outer surface thereof.

* * * * *